Patented June 27, 1939

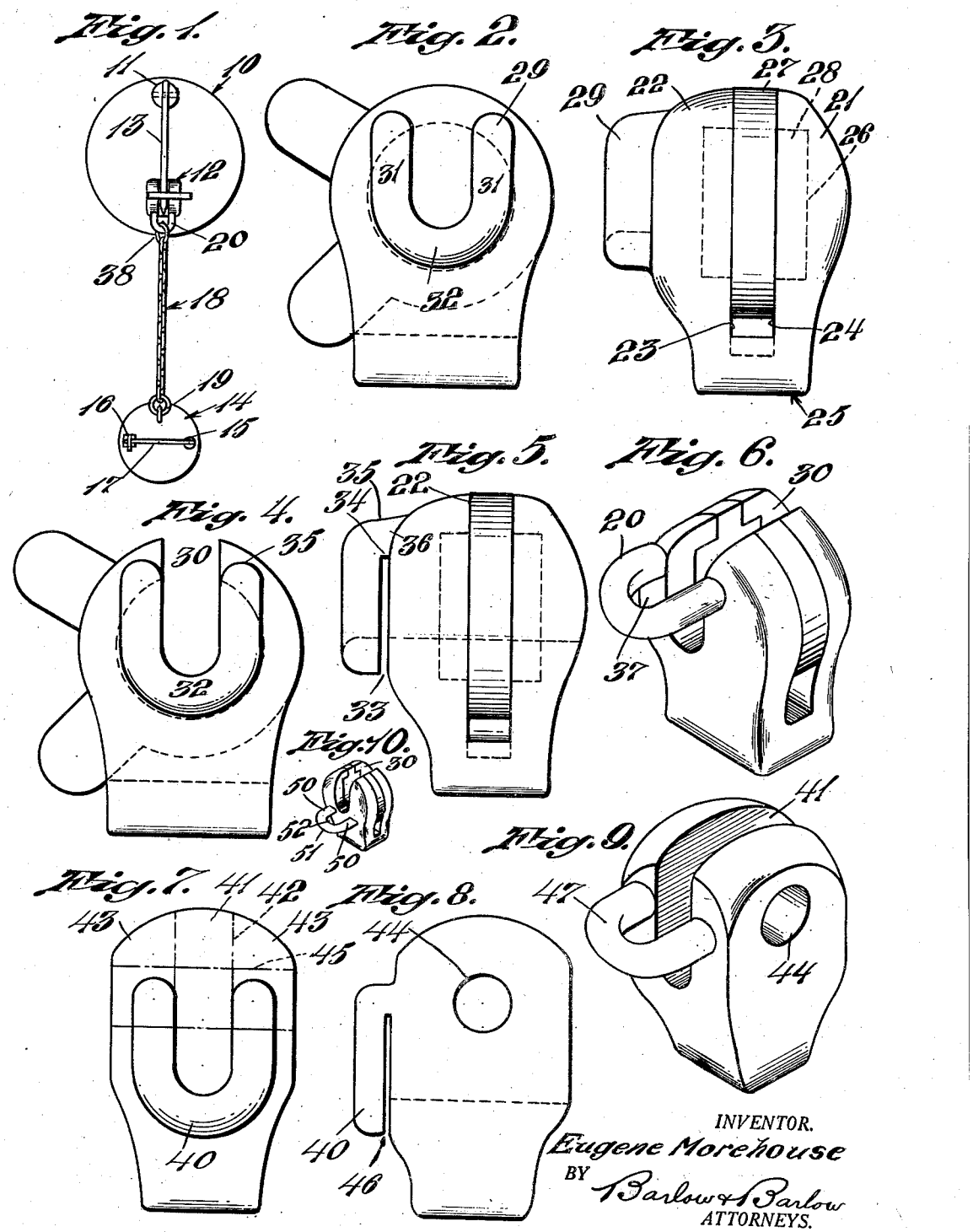

2,164,018

UNITED STATES PATENT OFFICE 2,164,018

COMBINED ATTACHING EYE AND PIN STEM JOINT OR SAFETY CATCH

Eugene Morehouse, Providence, R. I., assignor to B. A. Ballou & Co., Inc., a corporation of Rhode Island Application October 28, 1937, Serial No. 171,427

7 Claims. (Cl. 24—156)

This invention relates to a finding for use in connection with articles such as class pins and the like to be pinned upon the garment of the wearer, and more particularly relates to the pin stem joint or catch with which the pin stem is used on such an article of jewelry. An object of the invention is to provide on either the pin stem joint or catch an eye or member to which a chain may be attached which will be one piece with or of the same piece of stock as that from which the pin stem joint or catch is formed.

Another object of the invention is the method of manipulating the stock by which such integral attaching eye may be provided on the pin stem joint or catch as the same is formed.

Another object of the invention is to provide a guard for the pointed end of the pin stem to protect it from abrading the material on which it is mounted on the person of the wearer.

With these and other objects in view, the invention consists of certain novel features of construction, as will be more fully described, and particularly pointed out in the appended claims.

In the accompanying drawing:

Fig. 1 is a back view of a class pin with a guard member attached thereto by means of a chain, the safety catch of the class pin being equipped with my invention;

Fig. 2 is a side elevation of a partly formed safety catch made in accordance with this invention;

Fig. 3 is an end view of the same structure;

Fig. 4 is a view similar to Fig. 2 after the slotting step has been performed upon the body and rotor member therein;

Fig. 5 is a view similar to Fig. 3 showing the slotting step which is subsequently performed upon the eye attached to the device;

Fig. 6 is a perspective view showing the eye after being lifted into finished position;

Fig. 7 illustrates a pin stem joint embodying this invention;

Fig. 8 is a view similar to Fig. 7 but at right angles thereto after the slotting of the attaching eye;

Fig. 9 is a perspective view of the joint with the eye raised into finished position;

Fig. 10 is a perspective view of a modified form of safety catch.

In the use of safety catches and joints for pin stems, particularly where these are used on class pins and the like, it is desirable that an eye or some means be provided for attaching a chain to the class pin. Sometimes an eye is separately formed and soldered onto the class pin for the chain to be attached. In other instances the eye is formed upon the joint for the pin stem or the safety catch by forming the same on the peripheral edge of one ear and then bending; and in order to form such an eye in a more simple manner and yet one which will strengthen the parts of the joint or catch should any strain be exerted on the chain, I have arranged for this eye to be attached to opposite sides of a necessary slot in the structure so as to be supported therefrom and be symmetrical therewith; and I form this eye in a unique manner by shaping, slitting and bending of the parts for the accomplishment of this result; and the following is a more detailed description of the present embodiment of this invention, illustrating the preferred means by which these advantageous results may be accomplished:

With reference to the drawing, 10 designates an emblem such as a class pin or the like which is provided with a pin stem joint 11 and safety catch 12 for the pin stem 13. There is also provided a guard 14 for the emblem which has a pin stem joint 15, a safety catch 16 and a pin stem 17. The guard 14 is connected to the emblem 10 by means of a chain 18 connected to an eye 19 on the guard and to an eye 20 of the emblem, the eye 20 being an integral part with the safety catch on the emblem so that when the safety catch is attached to the emblem 10 by solder the eye will be in position to receive the chain and no separate attachment need be had such as the soldering of an eye onto the emblem.

In the formation of this improved structure the two ears 21 and 22 of the safety catch, as shown in Figs. 1 to 6, will be cut out in flat form and in a known manner and bent up into parallel relationship spaced apart as at 23 and 24 providing a solder base 25 for attachment to the emblem or the like. The ears will contain recesses 26 for pivotally mounting a rotor 27 by its trunnions 28 being located in these recesses 26. This is all usual construction in the method of forming a safety catch, as has been pointed out in connection with my other patents.

However, in the formation of this catch I provide a protuberance 29 on one of the ears 22. This protuberance 29 will be in the form of a U, as seen more particularly in Fig. 2, although some other shapes may be used and will be located in such a position that when the pin receiving slot 30 is formed in both of the ears and also in the rotor 27 that the milling tool or slotting cutter will pass between the arms 31 of the U-shaped protuberance and extend substantially downwardly to the arcuate or lower portion 32 of the U-shaped protuberance 29, this slot being illustrated more particularly in Fig. 4. After this slotting has been performed I then cut a slot 33, as illustrated in Fig. 5, extending upwardly from the arcuate portion 32 of the protuberance 29 to a point 34 short of the extremities 35 of the arms 31 at their point of connection to the ear 22 and leave an amount of stock 36 substantially equal in dimension to the width of the arms 31. After this slot has been made the protuberance 29 is then bent up into the position shown in Fig. 6, thus forming an eye having a space 37 for the reception of a ring 38 for attaching a chain 18 thereto.

In this manner no soldering operations are needed to form this eye, the eye is positioned symmetrically with reference to the pin receiving slot 30 and being on either side of this slot 30 prevents a spreading of the stock on opposite sides of the slot and also being in line with the pin stem forms a guard for the pointed end of the stem to protect the same and provides a point of connection which is readily accessible because of the added space provided by the slot. The catch is also far better looking than were an ear bent out from one edge in an unsymmetrical relation.

It will also be apparent that the U-shaped portion which I have above indicated with its arms extending upwardly may be so formed that its arms, as 50, extend downwardly with the arcuate portion 51 uppermost and in this case the slotting will be from the upper side of the catch downwardly and will occur prior to the slotting for the reception of the pin stem joint, such as 30, as shown in the previous figures. That is, the slotting comparable to the slot 33 will be made downwardly and the attaching eye will be bent outwardly to provide a loop 52, as shown in Fig. 10, prior to the slotting 30, as occurs in the previous construction.

This same inventive thought may be carried out in connection with a pin stem joint as is provided here in connection with a safety catch. Instead of a recess 26 and rotor 27 the inner surface of the ears would be flat to receive a pin stem or possibly with a small recess for the pivot, and instead of slotting as at 30 a cylindrical opening, where the wall were flat, would be bored through both ears. However, the slot 33 would be formed the same as in Fig. 5 and the eye 20 would be lifted therefrom.

The joint could also be formed in a somewhat different manner which is that of providing a solid affair such as shown in Fig. 7, as distinguished from the bent up structure above described, with a protuberance 40 thereon. A slot 41 would then be provided as designated by the dot-dash lines 42 to form ears 43, while an opening 44 shown by the dot-dash lines 45 would be drilled through the ears 43. Thereafter a slot as 46 would be formed in the protuberance 40 and the same lifted into position, as shown at 47 in Fig. 9, so as to form the eye spanning the slot 41 and leaving a space in the slot for the portion of the pin stem to receive a rivet in a known manner. If formed in this manner the eye would be supported by both ears and prevent a spreading of the ears as well as provide a symmetrical arrangement for housing the operating pin stem at its joint.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A combined attaching eye and pin stem joint or catch comprising a one piece body provided with a slot therein and U-shaped member integral therewith and extending therefrom and straddling said slot.

2. A combined attaching eye and pin stem catch comprising a body having a pair of ears, with a rotor slot between, a pin stem slot in both ears at right angles to the rotor slot, and an attaching eye bridging said pin stem slot.

3. A combined attaching eye and pin stem catch comprising a body having a pair of ears with a rotor slot between, a pin stem slot in both ears at right angles to the rotor slot, and an attaching eye of the same piece of stock as one ear and bridging said pin stem slot.

4. A combined attaching eye and pin stem catch comprising a body having a pair of ears with a rotor slot between, a pin stem slot in both ears at right angles to the rotor slot, and a U-shaped attaching eye integral with said body and bridging said slot.

5. A combined attaching eye and pin stem catch comprising a body having a pair of ears with a rotor slot between, a pin stem slot in both ears at right angles to the rotor slot, a U-shaped attaching eye on one ear and with the arc of the U extending from the ear to provide an attaching loop, and with the free ends of the U attached on opposite sides of the pin stem slot.

6. A combined attaching eye and pin stem joint or catch comprising a body with a slot therein and a U-shaped portion extending from the body with one arm of the U portion attached to the body on one side of the slot and the other arm of the U portion attached on the other side of the slot.

7. A combined attaching eye and pin stem joint or catch comprising a one piece body provided with a pin slot therein and a U-shaped member extending therefrom adjacent said slot with the arms of the member on opposite sides of the mid-plane of said slot.

EUGENE MOREHOUSE.